United States Patent
Kulkarni Wadhonkar et al.

(10) Patent No.: US 11,783,268 B2
(45) Date of Patent: Oct. 10, 2023

(54) SYSTEMS AND METHODS FOR PACKING VISUALIZATIONS

(71) Applicant: Walmart Apollo, LLC, Bentonville, AR (US)

(72) Inventors: Mangesh N. Kulkarni Wadhonkar, Hyderabad (IN); Parul Aggarwal, Bengaluru (IN); Nandini Tripathi, Allahabad (IN); Amit Jhunjhunwala, Bangalore (IN); Natasha Agarwal, Kolkata (IN); Ruofan Xu, Burlingame, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 30 days.

(21) Appl. No.: 17/217,381

(22) Filed: Mar. 30, 2021

(65) Prior Publication Data
US 2021/0304109 A1   Sep. 30, 2021

Related U.S. Application Data

(60) Provisional application No. 63/030,563, filed on May 27, 2020.

(30) Foreign Application Priority Data

Mar. 31, 2020   (IN) .............................. 202041014288

(51) Int. Cl.
*G06Q 10/00* (2023.01)
*G06Q 10/0639* (2023.01)
(Continued)

(52) U.S. Cl.
CPC ..... *G06Q 10/06398* (2013.01); *G06Q 10/087* (2013.01); *G06Q 10/0832* (2013.01); *G06T 19/006* (2013.01)

(58) Field of Classification Search
None
See application file for complete search history.

(56) References Cited

U.S. PATENT DOCUMENTS

| | | | |
|---|---|---|---|
| 6,721,762 B1 * | 4/2004 | Levine ................... | G06Q 10/04 707/999.102 |
| 6,876,958 B1 * | 4/2005 | Chowdhury ........... | G06Q 10/04 703/2 |

(Continued)

OTHER PUBLICATIONS

Tzuu-Hseng S. Li, Chih-Yin Liu, Ping-Huan Kuo, Nien-Chu Fang, Cheng-Hui Li, Ching-Wen Cheng, Cheng-Ying Hsieh, Li-Fan Wu, Jie-Jhong Liang, and Chih-Yen Chen (A Three-Dimensional Adaptive PSO-Based Packing Algorithm for an IoT-Based Automated e-Fulfillment Packaging System, 2169-3536-2017 IEEE). (Year: 2017).*

(Continued)

*Primary Examiner* — Hafiz A Kassim
(74) *Attorney, Agent, or Firm* — Fitch, Even, Tabin & Flannery LLP

(57) ABSTRACT

In some embodiments, apparatuses and methods are provided herein useful to presenting packing instructions to a user. In some embodiments, a system for presenting packing instructions to a user comprises a database configured to store packing information and item visualizations, wherein the packing information includes placements of items in orders in containers, and wherein the item visualizations depict appearances of items sold by the retailer, a control circuit configured to receive an order identifier for an order, retrieve packing information associated with the order and item visualizations for the items in the order, generate a packing visualization for the order, wherein the packing visualization for the order depicts placement of the items in the order in the container, transmit, to a display device for presentation, the packing visualization for the order, and a (Continued)

display device configured to present the packing visualization for the order to the user.

12 Claims, 3 Drawing Sheets

(51) Int. Cl.
    *G06T 19/00*     (2011.01)
    *G06Q 10/0832*     (2023.01)
    *G06Q 10/087*     (2023.01)

(56) References Cited

U.S. PATENT DOCUMENTS

| | | | | |
|---|---|---|---|---|
| 9,828,128 | B1* | 11/2017 | Linnell | B65B 57/00 |
| 10,147,210 | B1* | 12/2018 | Desai | H04N 7/183 |
| 10,268,984 | B1* | 4/2019 | Ramoji | G06Q 10/087 |
| 10,282,696 | B1* | 5/2019 | Bettis | G06Q 10/087 |
| 10,740,862 | B1* | 8/2020 | Cui | G06F 30/20 |
| 2006/0242154 | A1* | 10/2006 | Rawat | G06F 16/168 |
| 2010/0218131 | A1* | 8/2010 | Holm-Petersen | G06Q 10/087 |
| | | | | 715/771 |
| 2011/0134108 | A1* | 6/2011 | Hertenstein | G06T 19/006 |
| | | | | 345/419 |
| 2013/0106910 | A1* | 5/2013 | Sacco | G06Q 30/0261 |
| | | | | 345/633 |
| 2014/0172736 | A1* | 6/2014 | Saha | G06F 30/12 |
| | | | | 705/330 |
| 2016/0260054 | A1* | 9/2016 | High | G05D 1/0088 |
| 2018/0127118 | A1* | 5/2018 | Jones | G06Q 10/0832 |
| 2018/0374046 | A1* | 12/2018 | Powers | G06Q 10/08345 |
| 2019/0122174 | A1 | 4/2019 | Gil | |
| 2019/0149725 | A1 | 5/2019 | Adato | |
| 2019/0279426 | A1* | 9/2019 | Musunuri | G06Q 10/08 |
| 2019/0318300 | A1 | 10/2019 | Cox | |

OTHER PUBLICATIONS

Lucasware; "A Vision for Smart Glasses and Augmented Reality for Warehouse and DC Operations"; https://www.lucasware.com/smart-glasses-and-ar-for-warehouse-logistics/; pp. 1-9.

* cited by examiner

SYSTEMS AND METHODS FOR PACKING VISUALIZATIONS

CROSS-REFERENCE TO RELATED APPLICATION

This application claims the benefit of Indian Provisional Application No. 202041014288, filed Mar. 31, 2020, and U.S. Provisional Application No. 63/030,563, filed May 27, 2020, which are incorporated by reference in their entirety herein.

TECHNICAL FIELD

This invention relates generally to supply chains and, more particularly, to packaging products.

BACKGROUND

Customers frequently employ online shopping options due to the conveniences associated with shopping online. Whether customers have items shipped, or pick items up from a retail facility, the items are often packaged before they are shipped or picked up by the customer. While packing items in a container, such as a box, may seem like a trivial task, the scale at which this packing is performed for large retailers makes efficient packaging very important. For example, if a larger container than needed is used it can increase shipping costs as well as increase the number of shipments made. To help ensure that an appropriately sized container is used for an order, a container may be selected for the order based on the items in the order. However, simply providing an employee with the desired container size for the order does not help the employee actually package the items in the container, and many employees find it difficult to place all of the items in the container. Accordingly, a need exists for systems, methods, and apparatuses that can aid employees in placing items in containers.

BRIEF DESCRIPTION OF THE DRAWINGS

Disclosed herein are embodiments of systems, apparatuses, and methods pertaining to presenting packing instructions to a user. This description includes drawings, wherein.

Figure 1:
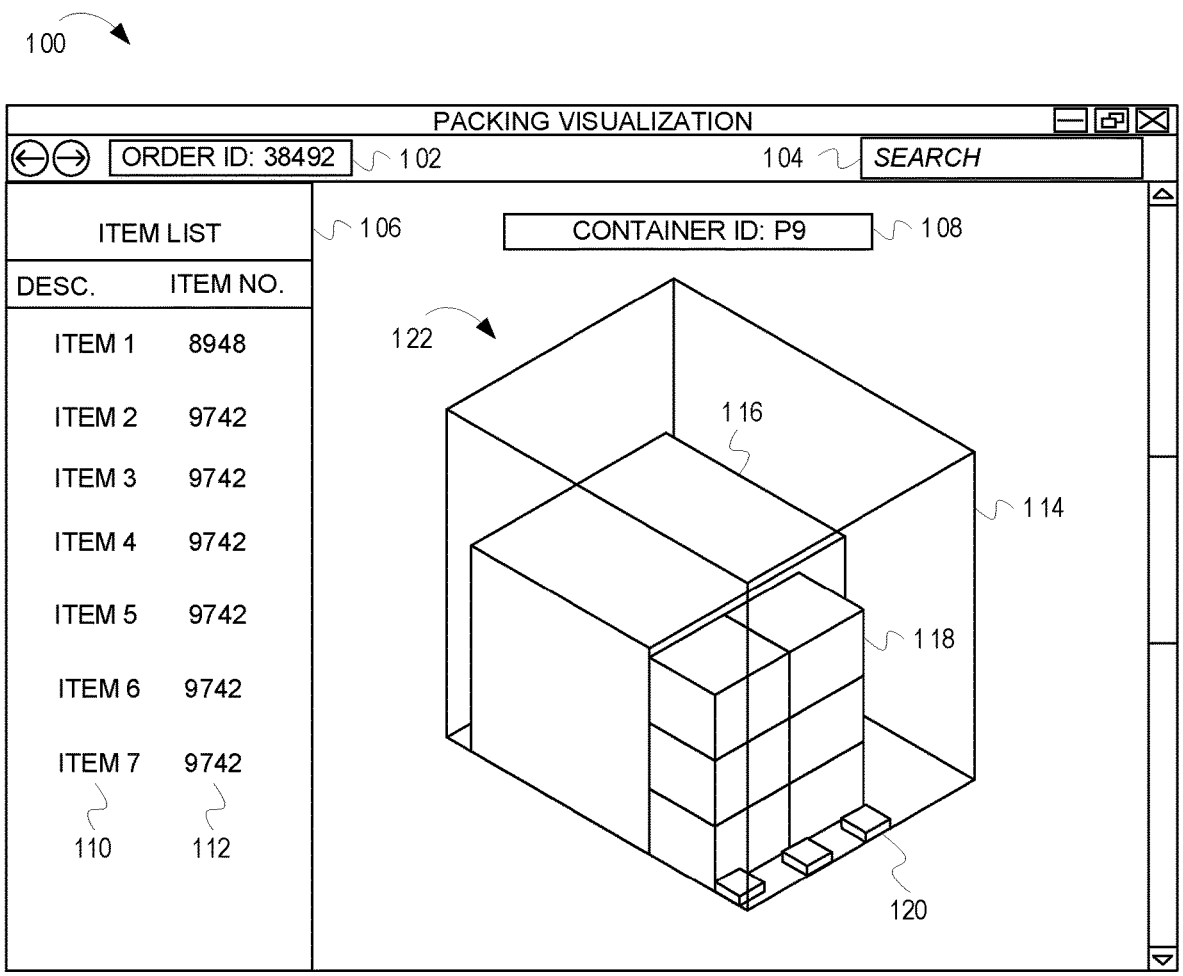
FIG. 1 depicts a packing visualization 122, according to some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses, and methods are provided herein useful to presenting packing instructions to a user. In some embodiments, a system for presenting packing instructions to a user for packing a plurality of items sold by a retailer into a container for delivery to consumers comprises a database, wherein the database is configured to store packing information and item visualizations, wherein the packing information includes placements of items in orders in containers, and wherein the item visualizations depict appearances of items sold by the retailer, a control circuit, wherein the control circuit is communicatively coupled to the database, and wherein the control circuit is configured to receive an order identifier for an order, retrieve, from the database based on the order identifier, packing information associated with the order and item visualizations for the items in the order, generate, based on the packing information associated with the order, a packing visualization for the order, wherein the packing visualization for the order depicts placement of the items in the order in the container to guide the user as to how to arrange the items in the container, and transmit, to a display device for presentation, the packing visualization for the order, and a display device, wherein the display device is configured to present the packing visualization for the order to the user.

As previously discussed, it is preferred to use an appropriately-sized container to package items for shipment and/or customer pickup. Using an appropriately-sized container can reduce the number of materials used to make the container, as well as the resources used to ship the containers. For example, if an appropriately-sized container is used, it can decrease the number of shipments made which can decrease the amount of fuel used, pollution produced, etc. Accordingly, it is desirable, not only from a cost perspective, to make packaging and shipping efficient. Unfortunately, while systems exist that can select an appropriately sized container based on the items that are to be placed in the container, such systems do not provide guidance as to how the items should be placed in the container so that all of the items fit in the container. Many employees find it difficult to place the items in the selected container size. This results in employee frustration and can also cause employees to use a container of a size other than recommended, negating or minimizing the benefits of selecting an appropriately-sized container for the order.

Described herein are systems, methods, and apparatuses that seek to reduce, if not eliminate, the issues of the current solutions. For example, in one embodiment, a system generates a packing visualization for an order. The packing visualization depicts how the items included in the order can be placed in the selected container so that all of the items will fit in the container. The packing visualization is presented to the employee so that he or she can reference the packing visualization when packing the order. The discussion of FIG. 1 provides an overview of such a system.

FIG. 1 depicts a packing visualization 122, according to some embodiments. The packing visualization 122 depicts a container 114 housing items and, in some embodiments, a sequence in which items should be placed in the container 114. Though the example depicted in FIG. 1 includes only one container. Embodiments are not so limited. For example an order may require multiple containers and, in such cases, the packing visualization 122 can depict the multiple containers. As depicted in FIG. 1, the container includes two types of items (i.e., a first item type 116 and a second item type 118) and seven items total (i.e., one instance of the first item type 116 and six instances of the second item type 118). Also, as depicted in FIG. 1, the packing visualization can include one or more packaging materials 120 (e.g., cardboard, Styrofoam, inflatable items, etc.) that can be included in the container 114 to protect the items in the container 114, fill voids in the container 114, etc. The items are represented by item visualizations. The item visualizations are based on the actual items that they represent. That is, the item visualizations can have the same, or similar, dimensions, coloration, shape, etc. as the items they represent. As one example, if the item is a box of cereal, the item visualization can be a rendering (e.g., a two- or three-dimensional rendering) of the box of cereal, that based on scale, is proportional in size to other item visualizations.

The packing visualization 122 is presented via a display device. For example, the display device can be located at a packing station and can be of any suitable type (e.g., a television, a computer monitor, etc.). In one embodiment, the packing station is located in a facility (e.g., a warehouse, distribution center, packing center, etc.) in an area with other packing stations. In such embodiments, a first employee can be tasked with retrieving items for an order. The employee traverses the facility collecting the items on a cart and delivers the cart including the items to the packing station. The packing station includes a platform upon which a second employee can work. The second employee is tasked with packing the items in the container 114. In such an embodiment, the display device is located at the packing station, for example above and/or behind the platform upon which the second employee is working. Accordingly, the display device is similar to a television or a computer monitor. The display device presents the user interface 100. In other embodiments, the second employee can make use of a mobile device (e.g., a smartphone, a head mounted display (e.g., glasses), a device dedicated to packing, etc.) and view an augmented reality (AR) presentation. In such embodiments, the mobile device can include the display device and the user interface 100 is presented in an augmented reality fashion. For example, the AR presentation can depict the item visualizations superimposed over the container 114. The AR presentation can depict all of the item visualizations, or only a portion of the item visualizations (e.g., as the employee progresses with packing the container 114). Further, in such embodiments, the mobile device can include a capture device (e.g., an image capture device, a radio frequency identification (RFID) reader, etc.). The capture device can capture data associated with one or more of the items and/or the order (e.g., an image of a barcode, a read of an RFID tag, etc.). In such embodiments, the mobile device can use the data to determine which item and/or order is being packed and retrieve packing information for the item and/or order.

FIG. 1 depicts an example of a user interface 100 presented via the display device. The user interface 100 can include any desired fields. For example, the example user interface 100 depicted in FIG. 1 includes an Order ID Field 102, a Search Field 104, an item list 106, and a Container ID Field 108. The Order ID Field presents an order ID of the order associated with the packing visualization 122 that is being presented. That is, as depicted in FIG. 1, the packing visualization 122 that is being presented via the user interface 100 is associated with Order ID 38492. The item list 106 presents the items that are included with the order (i.e., Order Id 38492 in FIG. 1) and includes a description of the item 110 as well as an item number (e.g., a SKU, product identifier, etc.) for the item. As discussed previously, the example depicted in FIG. 1 includes seven total items, one of which is the first item type 116 and six of which are of the second item type 118, as reflected in the item list 106. The Container ID Field 108 indicates the container(s) that should be used for the order and the Search Field 104 allows the employee to enter and retrieve an order. In some embodiments, the employee can also scan a tag to retrieve the order information.

In some embodiments, the employee can manipulate the packing visualization 122 via a user input device (e.g., a mouse, keyboard, joystick, trackpad, etc.). For example, the employee can manipulate the packing visualization 122 by rotating the packing visualization, changing the size of the packing visualization 122, changing the orientation of the packing visualization 122, adding and/or removing items from the packing visualization 122, changing the transparency and/or translucency of one or more of the items in the packing visualization, etc.

In some embodiments, an image capture device, such as a camera, can be used to capture images (e.g., still and/or video images) as the employee packs the container 114. Additionally, in some embodiments, the camera is a depth camera. In such embodiments, depth data from the depth camera can be used to more accurately determine locations of items and/or item visualizations in three-dimensional space. The images can be used for a number of purposes, dependent upon the embodiments. As one example, the images can be used to monitor the placement of the items in the container 114. This monitoring can be performed via image recognition and/or character recognition. For example, the system can analyze the images to determine which items have been placed in the container and the locations at which the items have been placed in the container. In one embodiment, the employee can be alerted if he or she has deviated from the packing visualization 122. For example, if the employee has placed an item within the container 114 in a location other than that depicted in the packing visualization 122, the user interface 100 can present an alert to indicate such to the employee. The alert may indicate that the employee should remove one or more items from the container. For example, if it is determined that the employee's deviation will result in all of the items no longer fitting in the container, the user interface 100 can present an alert. Additionally, or alternatively, an updated packing order (i.e., the order in which the items should be placed in the container 114 and/or the locations at which the items (e.g., the remaining items, or the items that have not yet been placed in the container 114, should be placed in the container 114) can be calculated, if possible, to accommodate the employee's deviation from the packing visualization 122. In such embodiments, an updated packing visualization can be generated based on the new packing order and the user interface can be updated to present the updated packing visualization. In some embodiments, the employee can override the alert. For example, if the packing visualization 122 suggests that a fragile item be placed below a heavy item, the employee can override the alert as it may be necessary to deviate from the packing visualization 122.

In further embodiments, the placement of the items in the container 114, and in some embodiments, the placement of items in containers by other employees, can be tracked (e.g., logged). Specifically, the deviations from the packing visualizations can be tracked that the employees make. Machine learning algorithms can be employed to find patterns in the deviations, and, if such patterns are found, incorporated into a packing order and/or packing visualization algorithms. As one example, the packing order algorithm and/or the packing visualization algorithm may not account for items that include liquid and instruct the employee to pack the liquid-filled item in an orientation other than upright. Because it is typically intuitive for a person to place liquid-filled items in an upright orientation and less intuitive for a computer algorithm to do so, the computer algorithm can learn from these deviations and account for them when calculating packing orders and/or generating packing visualizations. In one embodiment, these updates are made after a threshold has been reached (e.g., a number of occurrences, a percentage of the time that the deviation is made, etc.).

Figure 2:
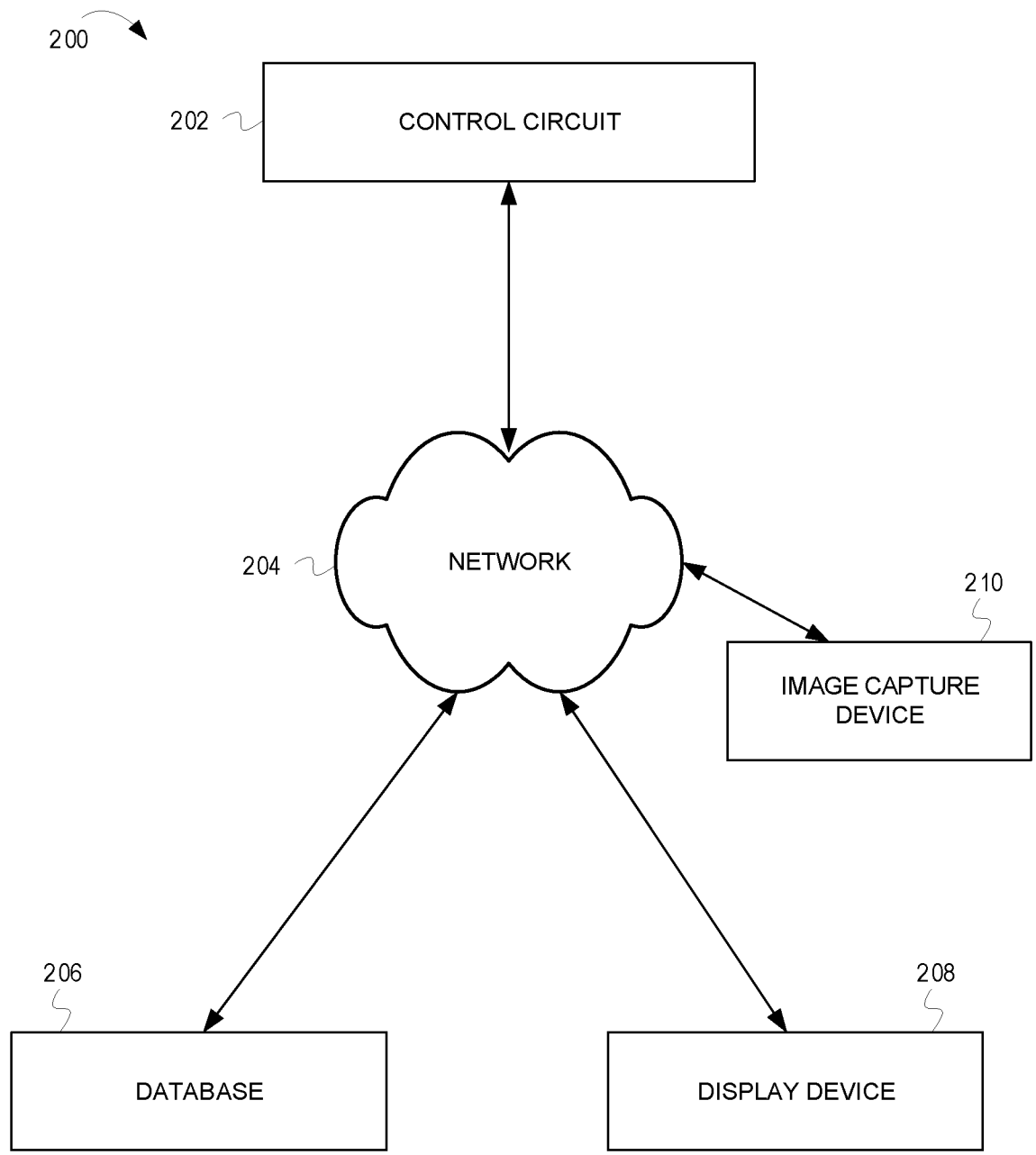
FIG. 2 is a block diagram of a system 200 for presenting packing instructions to a user, according to some embodiments.

While the discussion of FIG. 1 provides background information regarding presenting packing instructions to a user, the discussion of FIG. 2 provides additional detail regarding a system for presenting packing instructions to a user.

FIG. 2 is a block diagram of a system 200 for presenting packing instructions to a user, according to some embodiments. The system 200 includes a control circuit 202, a database 206, a display device 208, and an image capture device 210. The control circuit 202, database 206, display device 208, and image capture device 210 are communicatively coupled via a network 204. Accordingly, the network 204 can include a local area network (LAN) and/or a wide area network (WAN), such as the Internet, and include wired and/or wireless links.

The database 206 is configured to store packing information and item visualizations. The packing information includes placements of items in orders in containers. For example, the packing information can identify a desired container for an order, the items included in the order, and indications of where, within the desired container, the items should be placed. Additionally, in some embodiments, the packing information can include one or more of an indication of weights of items, item dimensions, item characteristics, and item orientations (e.g., desired, or required, orientations for items during packing). The item visualizations depict appearances of items sold by a retailer. For example, the item visualizations can be two- or three-dimensional renderings of the items. The item visualizations can be as detailed or basic as desired. For example, in a detailed embodiment, the item visualizations may appear to be photographic likenesses of items. In a less detailed embodiment, the item visualizations may simply be line drawings representing the basic shape of the items.

The control circuit 202 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. The control circuit 202 is configured (for example, by using corresponding programming as will be well understood by those skilled in the art) to carry out one or more of the steps, actions, and/or functions described herein.

By one optional approach the control circuit 202 operably couples to a memory. The memory may be integral to the control circuit 202 or can be physically discrete (in whole or in part) from the control circuit 202 as desired. This memory can also be local with respect to the control circuit 202 (where, for example, both share a common circuit board, chassis, power supply, and/or housing) or can be partially or wholly remote with respect to the control circuit 202 (where, for example, the memory is physically located in another facility, metropolitan area, or even country as compared to the control circuit 202).

This memory can serve, for example, to non-transitorily store the computer instructions that, when executed by the control circuit 202, cause the control circuit 202 to behave as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM).

The control circuit 202 generally generates the packing visualizations for use by the employees. The control circuit 202 receives order identifiers. The control circuit 202 can receive the order identifiers from the user via a user input device. As one example, the user can scan (e.g., optically, electromagnetically, etc.) an order identifier provided with the items for the order. The control circuit 202 retrieves, from the database 206 based on the order identifier, the packing information associated with the order and item visualizations for items in the order. The control circuit generates the packing visualization for the order based on the packing information associated with the order. The packing visualization for the order depicts placement of the items in the container to, for example, guide the user (e.g., an employee) as to how to arrange the items in the container.

Further, in embodiments in which the employee's placement of items in the container is monitored, for example by the image capture device 210, the control circuit 202 can log placement of the items in the container in the database 206. For example, the control circuit 202 can log deviations from the packing visualization that employees make when packing the container. Additionally, in some embodiments, the control circuit can, based on a machine learning algorithm, calculate an updated packing order and/or generate an updated packing visualization based on deviations made by the employee.

The display device 208 presents the packing visualization, as well as any other desired information, to the employee. Accordingly, the display device can be of any suitable type (e.g., and LCD, CRT, LED, etc. display). In some embodiments, the display device 208 is located at an employee packing station. In such embodiments, the employee may be provided with a cart or other device including the items for the order as well as an order identifier (e.g., located on tags affixed to one or more of the items). In such embodiments, the employee can scan the order identifier to provide the order identifier to the control circuit 202. The control circuit 202 generates the packing visualization and transmits the packing visualization to the display device 208 at the employee packing station.

Figure 3:
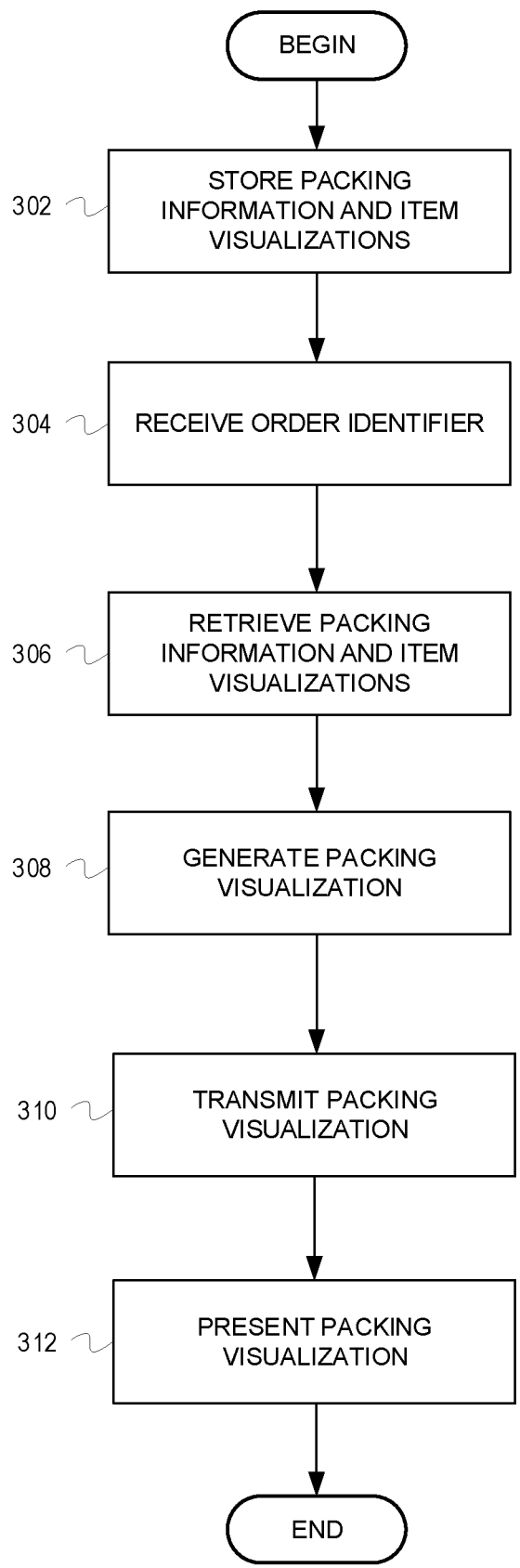
FIG. 3 is a flow chart depicting example operations for presenting packing instructions to a user, according to some embodiments.

While the discussion of FIG. 2 provides additional detail regarding a system for presenting packing instructions to a user, the discussion of FIG. 3 describes example operations of such a system.

FIG. 3 is a flow chart depicting example operations for presenting packing instructions to a user, according to some embodiments. The flow begins at block 302.

At block 302, packing information and item visualizations are stored. For example, a database can store the packing information and the item visualizations. The packing information includes a sequence in which items in an order should be placed in a container and/or placement of items in an order in a container. The item visualizations depict appearances of items sold by a retailer. The flow continues at block 304.

At block 304, an order identifier is received. For example, the control circuit can receive the order identifier. The order identifier can be received from a user, such as an employee, via a user input device. The user input device can include one or more of a touchscreen, a keyboard, a mouse, a trackpad, a scanner, etc. Accordingly, the order identifier can be received from the user in any suitable manner. The order identifier identifies the order. For example, the order identifier can be an order number, a transaction number, a transaction history, an indication of a person who placed the order, etc. In some embodiments, the user can capture the order identifier via a mobile device. For example, the mobile device can include a capture device, and the capture device can capture the order identifier. The flow continues at block 306.

At block 306, packing information and item visualization are retrieved. For example, the control circuit can retrieve the packing information and the item visualizations from the database. The control circuit retrieves the packing information and the item visualizations from the database based on the order identifier. The flow continues at block 308.

At block 308, a packing visualization is generated. For example, the control circuit can generate the packing visualization. In one embodiment, the control circuit, based on the packing information, generates an image depicting each of the item visualizations placed in the container. The packing visualization can appear to be two- or three-dimensional and may be capable of being manipulated by the employee. For example, if the packing visualization is two-dimensional, the packing visualization can include a number of two-dimensional images, each showing different views of the container including the item visualizations, between which the employee can toggle. If the packing visualization is a three-dimensional representation, the employee may be able to rotate, turn, etc. the packing visualization. The flow continues at block 310.

At block 310, the packing visualization is transmitted. For example, the control circuit can transmit the packing visualization to the display device for presentation to the employee. The flow continues at block 312.

At block 312, the packing visualization is presented. For example, the display device can present the packing visualization to the employee. If the packing visualization is capable of being manipulated, the display device can present the manipulation of the packing visualization. In one embodiment, the display device is located at a packing station. In such embodiments, the display device can be similar to a television or computer monitor. Alternatively, the display device can be included in a mobile device and present an AR presentation. In such embodiments, the AR presentation includes the packing visualization.

In some embodiments, a system for presenting packing instructions to a user for packing a plurality of items sold by a retailer into a container for delivery to consumers comprises a database, wherein the database is configured to store packing information and item visualizations, wherein the packing information includes placements of items in orders in containers, and wherein the item visualizations depict appearances of items sold by the retailer, a control circuit, wherein the control circuit is communicatively coupled to the database, and wherein the control circuit is configured to receive an order identifier for an order, retrieve, from the database based on the order identifier, packing information associated with the order and item visualizations for the items in the order, generate, based on the packing information associated with the order, a packing visualization for the order, wherein the packing visualization for the order depicts placement of the items in the order in the container to guide the user as to how to arrange the items in the container, and transmit, to a display device for presentation, the packing visualization for the order, and a display device, wherein the display device is configured to present the packing visualization for the order to the user.

In some embodiments, an apparatus and a corresponding method performed by the apparatus comprises storing, in a database, packing information and item visualizations, wherein the packing information includes placement of items in orders in containers, and wherein the item visualizations depict appearances of items sold by retailers, receiving, at a control circuit, an order identifier for an order, retrieving, by the control circuit from the database based on the order identifier, packing information associated with the order and item visualizations for the items in the order, generating, by the control circuit based on the packing information associated with the order, a packing visualization for the order, wherein the packing visualization for the order depicts placement of the items in the order in the container to guide the user as to how to arrange the items in the container, transmitting, by the control circuit to a display device for presentation, the packing visualization for the order, and presenting, via the display device, the packing visualization for the order.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for presenting packing instructions to a user for packing a plurality of items sold by a retailer into a container for delivery to consumers, the system comprising:
a database, wherein the database is configured to store packing information and item visualizations, wherein the packing information includes placements of items in orders in containers, and wherein the item visualizations depict appearances of items sold by the retailer;
a control circuit, wherein the control circuit is communicatively coupled to the database, and wherein the control circuit is configured to:
receive an order identifier for an order;
retrieve, from the database based on the order identifier, packing information associated with the order and item visualizations for the items in the order;
generate, based on the packing information associated with the order, a packing visualization for the order, wherein the packing visualization for the order depicts placement of the items in the order in the container to guide the user as to how to arrange the items in the container; and
transmit, to a display device for presentation, the packing visualization for the order;

a display device, wherein the display device is configured to present the packing visualization for the order to the user; and an image capture device, wherein the image capture device is configured to capture images of the user placing the items in the container;

wherein the control circuit is further configured to:
  receive, from the image capture device, the images of the user placing the items in the container; and
  determine, based on the images of the user placing the items in the container, that the user has deviated from the placement of the items in the order in the container by comparison to the generated packing visualization for the order;

wherein a machine learning model is employed to find patterns in the user's deviations, the machine learning model accessing the database for indications of the user's deviation from the placement of the items in the order in the container;

wherein the machine learning model is configured to:
  determine, based on accessing the database, that the user's deviation from the placement of the items in the order in the container has occurred at least a threshold number of times; and
  update an algorithm for determining placement of items based on the user's deviation from the placement of the items in the order in the container.

2. The system of claim 1, wherein the placement for the items in the order includes a sequence in which each of the items in the order should be placed in the container.

3. The system of claim 1, wherein the packing information includes one or more of an indication of the container, weights of items, item dimensions, item characteristics, and item orientations.

4. The system of claim 1, wherein the control circuit is further configured to:
  generate, based on the determination that the user has deviated from the placement of the items in the order in the container, an updated packing visualization for the order.

5. The system of claim 1, wherein the control circuit is further configured to:
  determine, based on the determination that the user has deviated from the placement of the items in the order in the container, that the items in the order will no longer fit in the container; and
  transmit, for presentation via the display device, an alert.

6. The system of claim 1, further comprising a mobile device, wherein the mobile device includes the display device, and wherein the packing visualization is included in an augmented reality (AR) presentation.

7. A method for presenting packing instructions to a user for packing a plurality of items sold by a retailer into a container for delivery to consumers, the method comprising:
  storing, in a database, packing information and item visualizations, wherein the packing information includes placement of items in orders in containers, and wherein the item visualizations depict appearances of items sold by the retailer;
  receiving, at a control circuit, an order identifier for an order;
  retrieving, by the control circuit from the database based on the order identifier, packing information associated with the order and item visualizations for the items in the order;
  generating, by the control circuit based on the packing information associated with the order, a packing visualization for the order, wherein the packing visualization for the order depicts placement of the items in the order in the container to guide the user as to how to arrange the items in the container;
  transmitting, by the control circuit to a display device for presentation, the packing visualization for the order;
  presenting, via a display device, the packing visualization for the order to the user
  capturing, via an image capture device, images of the user placing the items in the container;
  receiving, by the control circuit from the image capture device, the images of the user placing the items in the container; and
  determining, by the control circuit based on the images of the user placing the items in the container, that the user has deviated from the placement of the items in the order in the container by comparison to the generated packing visualization for the order;

wherein a machine learning model is employed to find patterns in the user's deviations, the machine learning model accessing the database for indications of the user's deviation from the placement of the items in the order in the container;

wherein the machine learning model is configured to:
  determine, based on accessing the database, that the user's deviation from the placement of the items in the order in the container has occurred at least a threshold number of times; and
  update an algorithm for determining placement of items based on the user's deviation from the placement of the items in the order in the container.

8. The method of claim 7, wherein the packing information includes the placement for the items in the order.

9. The method of claim 7, wherein the placement for the items in the order includes a sequence in which each of the items in the order should be placed in the container.

10. The method of claim 7, further comprising:
  generating, by the control circuit based on the determination that the user has deviated from the placement of the items in the order in the container, an updated packing visualization for the order.

11. The method of claim 7, further comprising:
  determining, by the control circuit based on the determination that the user has deviated from the placement of the items in the order in the container, that the items in the order will no longer fit in the container; and
  transmitting, by the control circuit for presentation via the display device, an alert.

12. The method of claim 7, wherein the display device is included with a mobile device, and wherein the packing visualization is part of an augmented reality (AR) presentation.

* * * * *